Nov. 4, 1930. J. P. MALONE 1,780,267
APPARATUS AND METHOD FOR CHILLING MEATS
Filed Aug. 20, 1928
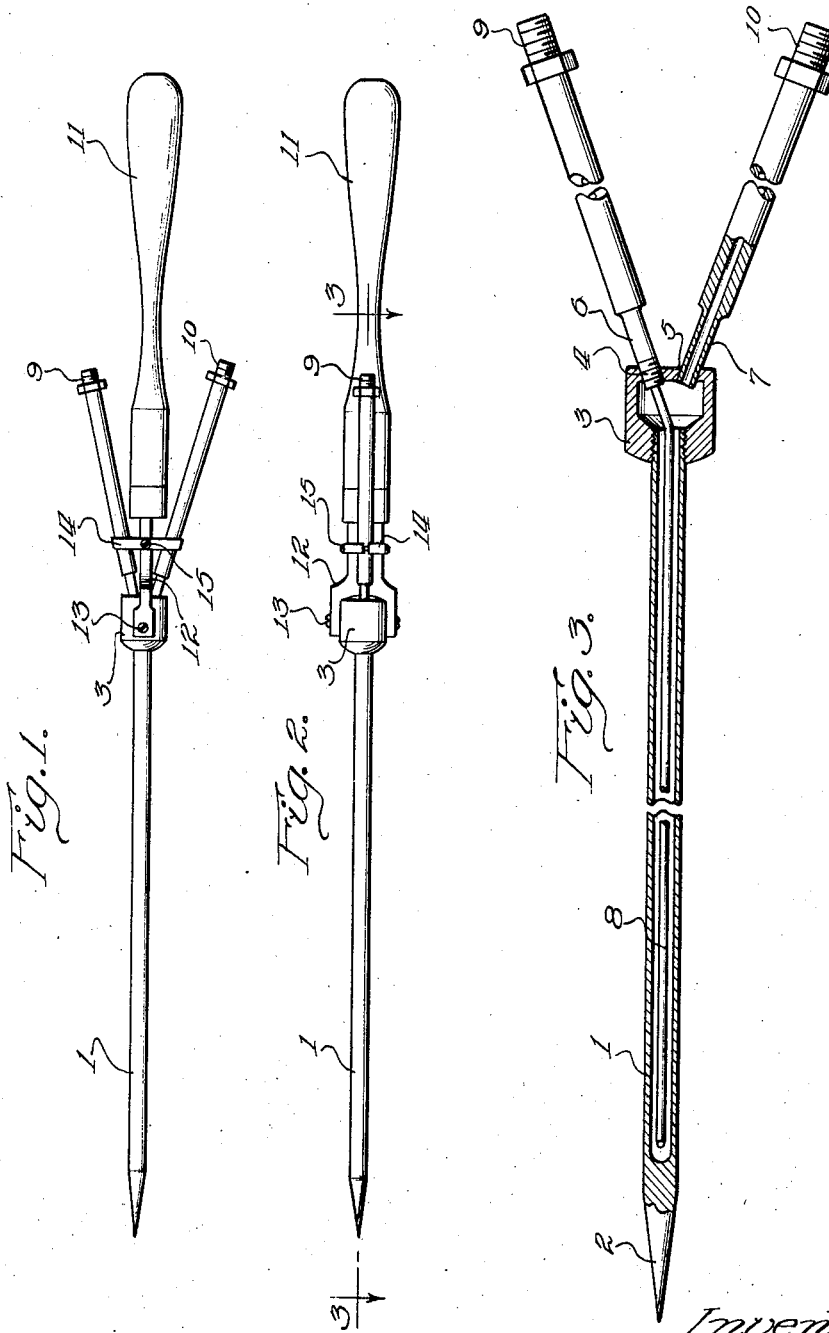
Witnesses.
Arthur M. Framke.
Robert E. Harris
Inventor.
John P. Malone.
Rummler & Rummler,
Attys.

Patented Nov. 4, 1930

1,780,267

UNITED STATES PATENT OFFICE

JOHN P. MALONE, OF CHICAGO, ILLINOIS, ASSIGNOR OF ONE-HALF TO ADAM P. YOUNG, OF CHICAGO, ILLINOIS

APPARATUS AND METHOD FOR CHILLING MEATS

Application filed August 20, 1928. Serial No. 300,746.

This invention relates to an improved apparatus and method for chilling meats, and particularly to a process and means for chilling the interior portions of a carcass along the deeply imbedded, bony structure thereof.

Heretofore chilling of meats has been effected by allowing large portions of a carcass to remain in a cooling room for substantially 24 hours. By this ordinary method, heat is rapidly absorbed from the surface and exterior portions of the meat during the first stages of the cooling period, and extraction of heat from the interior portions of the carcass and along the bony structure thereof is greatly impeded by a case-hardened exterior layer of flesh formed by the rapid cooling and freezing of the surface of the meat. As a result, the interior portions of the meat are never properly chilled by the ordinary method of exposure to a cold atmosphere, and much time is required to chill a carcass sufficiently to prevent growth of bacteria along the deeply imbedded bony structure of the carcass.

The main objects of this invention are to provide an improved apparatus and method for chilling meat for avoiding the excessive waste frequently occasioned by uneven chilling or insufficient chilling of the interior of the meat, to provide an improved chilling process for thoroughly chilling a carcass throughout its entirety in a substantially short period of time, and to avoid contamination of the interior of meats by preservative or cooling fluids.

In the accompanying drawings I have shown an embodiment of my invention, in which Figure 1 is a top plan view.

Fig. 2 is a side elevation.

Fig. 3 is a fragmentary central section taken on the line 3—3 of Fig. 2 with the handle removed.

In the form shown, a needle 1, preferably comprising a metal, cylindrical, tubular member, is provided at its forward end with a conical shaped, pointed extremity 2. The pointed end of the needle is closed and the rear extremity is open and is threaded in an aperture in an enlarged hollow cap 3, which is provided at its opposite end with spaced apertures 4 and 5. An intake conduit 6 is threaded in the aperture 4 and an exhaust conduit 7 is threaded in the aperture 5. An injection tube 8 is communicatively connected with the inner end of the intake conduit 6 and extends forwardly substantially to the forward end of the passage in the needle 1. The above described arrangement permits brine or suitable cooling fluid to be discharged into the interior of the needle at the forward end thereof, through the open extremity in the injection tube 8. The fluid is then free to circulate rearwardly through the space between the interior wall of the needle 1 and the exterior surface of the injection tube 8, to the hollow cavity in the cap 3, from which it is discharged from the device through the exhaust conduit 7 and a hose, not shown in the drawing.

The outer extremities of the conduits 6 and 7 are provided with threaded portions 9 and 10 respectively, for receiving hose couplings not shown in the drawings. A handle 11, comprising a forked tongue 12, is rigidly mounted on the hollow cap 3 by screws 13, which extend through apertures in the forked tongue. The intake and exhaust conduits are rigidly connected to the tongue by metal clamping strips 14, attached to the tongue by a screw 15.

The chilling device may be gripped by the handle 11 and the needle 1 may be inserted along the bony structure of a carcass or into the thick, fleshy portions thereof soon after the carcass has been placed in a cooling room. A cooled brine solution or suitable cooling fluid may be circulated continuously through the needle 1, from the forward end portion thereof to the rear hollow cap. The metal needle 1 conducts heat from the interior of the carcass into which the needle is inserted to the circulating fluid which in turn absorbs and carries the heat through a hose, not shown in the drawing, to a remote apparatus which cools the exhausted brine. When the needle is withdrawn the incision closes and the interior portions of the carcass remain at a temperature sufficiently low to prevent growth of bacteria.

Although but one specific embodiment of this invention has been herein shown and described, it will be understood that details of the construction shown may be altered or omitted without departing from the spirit of this invention as defined by the following claims.

I claim:

1. A device for chilling meats comprising a conduit, and means for circulating a refrigerant from the forward end of said conduit to the rearward end thereof comprising an injection tube opening into said conduit at its forward end and a discharge tube communicative with the rear end thereof, in manner adapted to cause the lowest temperature to be near the forward end.

2. The method of chilling the interior of meats which consists of inserting a hollow needle into a carcass along the bony structure thereof, injecting cooling fluid into the interior of said hollow needle at the forward end thereof, and discharging the cooling fluid from the rear end of said needle for circulating the cooling fluid rearwardly through said needle, in manner adapted to cause the lowest temperature to be near the forward end.

Signed at Chicago this 15th day of August, 1928.

JOHN P. MALONE.